(12) United States Patent
Goodsitt et al.

(10) Patent No.: US 12,462,103 B2
(45) Date of Patent: *Nov. 4, 2025

(54) REPRESENTING CONFIDENCE IN NATURAL LANGUAGE PROCESSING

(71) Applicant: Capital One Services, LLC, McLean, VA (US)

(72) Inventors: Jeremy Goodsitt, Champaign, IL (US); Austin Walters, Savoy, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 288 days.

This patent is subject to a terminal disclaimer.

(21) Appl. No.: 18/211,874

(22) Filed: Jun. 20, 2023

(65) Prior Publication Data

US 2023/0359827 A1 Nov. 9, 2023

Related U.S. Application Data

(63) Continuation of application No. 17/961,915, filed on Oct. 7, 2022, now Pat. No. 11,720,753, which is a continuation of application No. 17/004,728, filed on Aug. 27, 2020, now Pat. No. 11,501,074.

(51) Int. Cl.
*G06F 40/295* (2020.01)

(52) U.S. Cl.
CPC .................................. *G06F 40/295* (2020.01)

(58) Field of Classification Search
None
See application file for complete search history.

(56) References Cited

U.S. PATENT DOCUMENTS

| | | |
|---|---|---|
| 7,236,932 B1 | 6/2007 | Grajski |
| 9,965,443 B2 | 5/2018 | Eggink et al. |
| 10,140,421 B1 | 11/2018 | Bernard et al. |
| 10,394,951 B1 | 8/2019 | Adeeko, Jr. |
| 10,747,962 B1 | 8/2020 | Fuerstenau et al. |
| 11,194,971 B1 | 12/2021 | Dobranic |

(Continued)

OTHER PUBLICATIONS

17804731K. Lim and J. Park, "Part-of-Speech Tagging Using Multiview Learning," in IEEE Access, vol. 8, pp. 195184-195196, 2020, doi: 10.1109/ACCESS.2020.3033979 (Year: 2020).*

(Continued)

*Primary Examiner* — Frank D Mills
(74) *Attorney, Agent, or Firm* — Banner & Witcoff, Ltd.

(57) ABSTRACT

Methods, systems, and computing devices for visualizing natural language processing algorithm processes are described herein. A plurality of categories may be determined. Each color of a plurality of colors may correspond to the categories. Text content may be processed using a natural language processing algorithm. Confidence values indicating, for each of a plurality of portions of the text content, a degree of confidence corresponding to one or more of the plurality of categories may be determined. Display colors may be determined based on the confidence values. A user interface comprising a visualization of the text content may be displayed, and the user interface may be configured to show each portion of the text content using a display color such that the user interface indicates changes in confidence across the plurality of characters.

20 Claims, 6 Drawing Sheets

(56) References Cited

U.S. PATENT DOCUMENTS

| | | |
|---|---|---|
| 2004/0163035 A1 | 8/2004 | Ariel et al. |
| 2006/0026527 A1 | 2/2006 | Bells |
| 2008/0007749 A1 | 1/2008 | Woolfe |
| 2008/0010605 A1* | 1/2008 | Frank .................. G06F 16/29 715/765 |
| 2008/0212901 A1 | 9/2008 | Castiglia et al. |
| 2011/0135195 A1 | 6/2011 | Marchesotti et al. |
| 2013/0151257 A1 | 6/2013 | MacMannis et al. |
| 2014/0088944 A1 | 3/2014 | Natarajan et al. |
| 2014/0201215 A1 | 7/2014 | Benner et al. |
| 2014/0201631 A1 | 7/2014 | Pomprasitsakul et al. |
| 2015/0113388 A1* | 4/2015 | Barrett ............. G06F 16/24578 715/249 |
| 2015/0293897 A1 | 10/2015 | Myslinski |
| 2015/0379006 A1 | 12/2015 | Dorner et al. |
| 2016/0019885 A1 | 1/2016 | Romano et al. |
| 2017/0177180 A1 | 6/2017 | Bachmann et al. |
| 2018/0165696 A1* | 6/2018 | Bessen .................. G06F 40/279 |
| 2019/0017840 A1 | 1/2019 | Okamoto et al. |
| 2019/0050376 A1 | 2/2019 | Krebs et al. |
| 2019/0156153 A1 | 5/2019 | Can et al. |
| 2019/0295110 A1* | 9/2019 | Bessen .................. G06N 20/00 |
| 2019/0392257 A1 | 12/2019 | Foley et al. |
| 2020/0134021 A1 | 4/2020 | Moore et al. |
| 2020/0301999 A1 | 9/2020 | Co et al. |
| 2022/0189190 A1* | 6/2022 | Arroyo .................. G06V 10/82 |

OTHER PUBLICATIONS

Jan. 22, 2024—(EP) Extended European Search Report—U.S. Appl. No. 21/862,750.

Jakub Czakon, "Exploratory Data Analysis for Natural Language Processing", pp. 1-36, Mar. 19, <<https://towardsdatascience.com/exploratory-data-analysis-for-natural-language-processing-ff0046ab3571>>, printed Jul. 20, 2020,.

"Confidence Estimation for Natural Language Applications," pp. 1-2, 2003 Summer Workshop, csp.jhu.edu/workshops/03-workshop/confidence-estimation-for-natural-language-applications, date of publication unknown but, prior to Aug. 27, 2020.

"Use data bars, color scales, and icon sets to highlight data", pp. 1-3, support.microsoft.com/en-us/office/use-data-bars-color-scales-and-icon-sets-to-highlight-data-f118doa6-5921-4e2e-905b-fe0of3378fb9, date of publication unknown but, prior to Aug. 27, 2020.

"Text Analysis", pp. 1-94, MonkeyLearn, <<https://monkeylearn.com/text-analysis/>>, printed Jul. 20, 2020.

Nov. 22, 2021—(WO) International Search Report & Written Opinion—App. No. PCT/US2021/047776.

Keith Vertanen et al., "On the Benefits of Confidence Visualization in Speech Recognition" Cavendish Laboratory, University of Cambridge, CHI 200 Proceedings, Apr. 5-10, 2008, pp. 1497-1500.

Rikters, Mafiss, Mark Fishel, and Ondrej Bojar. "Visualizing neural machine translation attention and confidence." The Prague Bulleting of Mathematical Linguistics 109, No. 1 (2017): 39. (Year: 2017), 12 pages.

* cited by examiner

A very quick red panda.

012-345-6789

(601)

FIG. 6a (602a) A (602b) very quick (602c) red panda.

REPRESENTING CONFIDENCE IN NATURAL LANGUAGE PROCESSING

CROSS REFERENCE TO RELATED APPLICATIONS

This application is a continuation of U.S. application Ser. No. 17/961,915, entitled "Representing Confidence in Natural Language Processing" and filed Oct. 7, 2022, which is a continuation of U.S. application Ser. No. 17/004,728, entitled "Representing Confidence in Natural Language Processing" and filed Aug. 27, 2020. The contents of the above listed application is expressly incorporated herein by reference in its entirety for any and all non-limiting purposes.

FIELD OF USE

Aspects of the disclosure relate generally to natural language processing, machine learning algorithms, and hardware and software relating to the same. More specifically, aspects described herein relate to representing the confidence of natural language processing of text content across different portions of the text content.

BACKGROUND

Natural language processing algorithms may be configured to process content text to, for example, categorize all or portions of the text. For example, a natural language processing algorithm may be configured to process a paragraph of text to determine the topic of all or portions of the paragraph. Such processing may advantageously allow organizations to quickly understand text without requiring human review of such text. For example, an organization might use a natural language processing algorithm to process e-mails received in a customer support inbox to determine which department to forward the e-mails to. As another example, an organization might use a natural language processing algorithm to process long transcripts to determine portions of the transcript which discuss topics of particular interest. That said, it can be difficult to analyze why and how a natural language algorithm categorizes certain portions of text. For example, a natural language algorithm might be relatively less certain regarding its categorization of certain words as compared to other words, but the output of such an algorithm might not reflect this uncertainty. In this way, the output of a natural language processing algorithm might hide uncertainties and errors experienced by the natural language processing algorithm, which can make the natural language processing algorithm significantly less accurate and reliable.

Aspects described herein may address these and other problems, and generally improve the quality, efficiency, and speed of natural language processing algorithms by providing a visualization of the processes performed by, and the confidence of, natural language processing algorithms. By representing, for example, the confidence of natural language processing algorithms progressively across text (e.g., across different characters of the same word, across multiple words of a sentence, or the like), organizations using the natural language processing algorithms may identify strengths and weaknesses of the algorithm when handling different portions of text content.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein relate to presenting content, such as text content, in a manner which represents confidence of a natural language processing algorithm as the natural language processing algorithm processes the content. A computing device may determine a plurality of categories for text content. For example, one category might correspond to customer praise, and another category might correspond to a customer complaint. A plurality of colors may be determined, each corresponding to a different category of the plurality of categories. For example, customer praise may correspond to green, and customer complaints may correspond to red. One or more natural language processing algorithms may process the text content by associating one or more portions (e.g., one or more characters) of the text content with a corresponding one of the plurality of categories. For each of the one or more portions of the text content, the computing device may determine confidence values that indicate, for the portion, a degree of confidence corresponding to one or more of the plurality of categories. And, for the one or more of the portions of the text content, the computing device may determine a display color based on at least two of the plurality of colors. The computing device may cause display of a user interface comprising a visualization of the text content such that the user interface is configured to display each character of the plurality of characters of the text content using a corresponding display color. For example, a portion of the text content with a 25% confidence value corresponding to a customer praise and a 75% confidence value corresponding to a customer complaint might be tinted 25% green and 75% red. In this manner, the text content may be displayed such that the user interface indicates changes in confidence across the plurality of characters.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 6a shows illustrative text content.

FIG. 6b shows the illustrative text content of FIG. 6a with display colors based on natural language processing.

DETAILED DESCRIPTION

Figure 1:
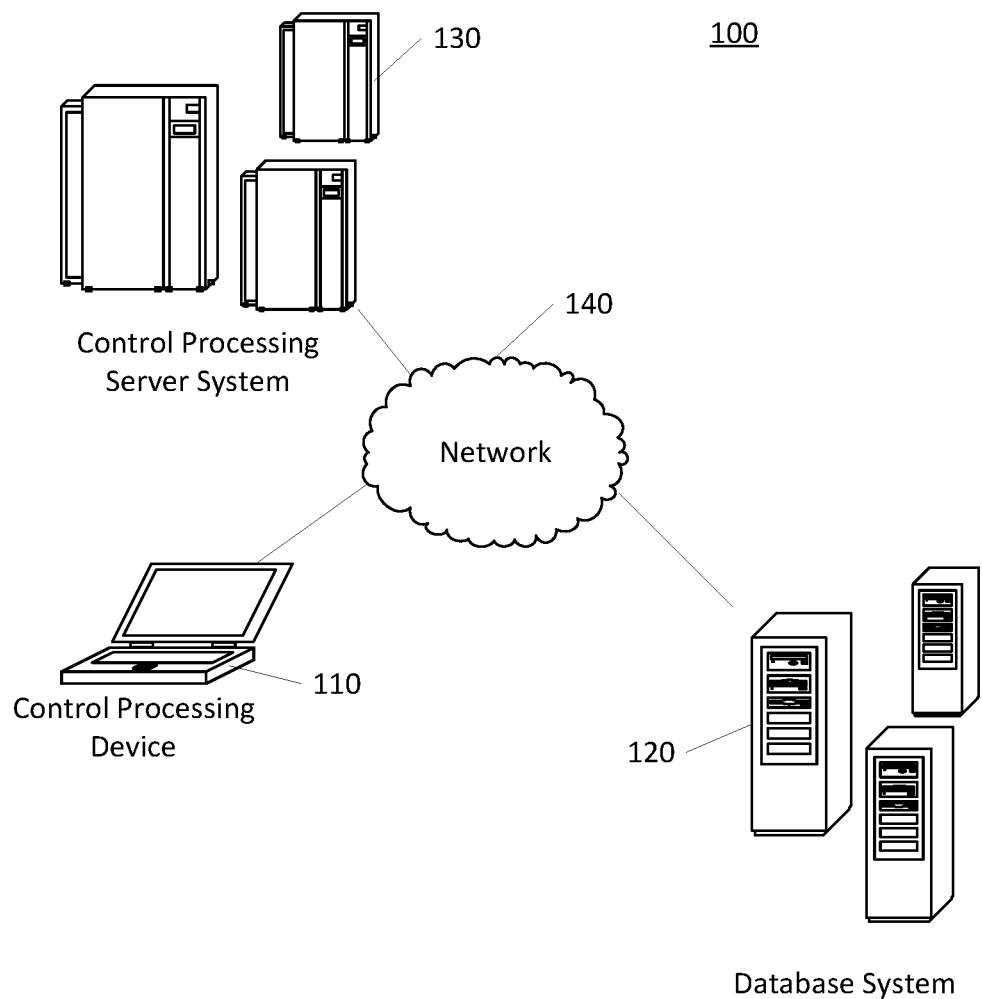
FIG. 1 shows an example of a control processing system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for representing natural language processing of text content.

Systems as described herein may include presenting content, such as text, in a manner which indicates confidence of a natural language processing algorithm as the natural language processing algorithm processes the content. A computing device may determine a plurality of categories, each corresponding to a different possible meaning of at least a portion of text content. For example, one category might correspond to customer praise, and another category might correspond to a customer complaint. A plurality of colors may be determined, each corresponding to a different category of the plurality of categories. The categories may correspond to different possible meanings of the plurality of portions of the text content. For example, customer praise may correspond to green, and customer complaints may correspond to red. One or more natural language processing algorithms may process the text content by associating one or more portions (e.g., one or more characters, one or more words, and/or one or more sentences) of the text content with a corresponding one of the plurality of categories. For each of the one or more portions of the text content, the computing device may determine confidence values that indicate, for the portion, a degree of confidence corresponding to one or more of the plurality of categories. And, for the one or more of the portions of the text content, the computing device may determine a display color by blending, based on the plurality of confidence values, at least two of the plurality of colors. Blending the colors may comprise, for example, modifying the opacity of one or both of the colors, determining a combination of the colors, generating a gradient using the colors, or the like. Additionally and/or alternatively, blending the colors may comprise showing all colors as differently-sized bars of color behind text, where the height of the bars corresponds to a respective confidence value. Where a confidence value satisfies (e.g., exceeds) a threshold, such as a 90% confidence value, a single color (e.g., a color corresponding to a category with 95% confidence value) may be used and, e.g., blended with a background of a user interface. Such a single color may comprise a background color of the user interface and/or may be configured to be displayed in some manner next to or nearby a corresponding portion. The computing device may cause display of a user interface comprising a visualization of the text content such that the user interface is configured to display each character of the plurality of characters of the text content using a corresponding display color. The display color may be, for example, used as a background to the text. For example, a portion of the text content with a 25% confidence value corresponding to a customer praise and a 75% confidence value corresponding to a customer complaint might be tinted 25% green and 75% red. In this manner, the text content may be displayed such that the user interface indicates changes in confidence across the plurality of characters.

A simplified example of the above is provided herein. A natural language processing algorithm may be configured to categorize ten-character strings of numbers as either product identification numbers or phone numbers. The natural language processing algorithm may, for example, process the string "012-345-6789." The output of the natural language processing algorithm may comprise a categorization as to whether the string is a product identification number or a phone number. As described above, the process described herein may comprise visualizing, across the ten-digit string above, the process of the natural language processing algorithm. For example, phone number category may correspond to the color green, and a product identification number category may correspond to the color red. The first two digits ("01") of the ten-digit string may be colored green to indicate that, initially, the natural language processing algorithm estimated the first two digits of the ten-digit string to be a phone number with a 90% confidence value. Then, the next two digits ("2-3") may be colored a blend of green and red to indicate that the natural language processing algorithm estimated the next two digits of the ten-digit string to be a phone number with a 60% confidence value and with a 40% confidence that the same digits may be a product identification number. Then, the next three digits ("45-6") may be colored red to indicate that the natural language processing algorithm estimated the next three digits of the ten-digit string to be a product identification number with a 10% confidence value but with 0% confidence that those digits correspond to a phone number. Then, the next three digits ("789") may be colored red to indicate that the natural language processing algorithm estimated the next three digits of the ten-digit string to be a product identification number with a 90% confidence value. In this way, the ten-digit string may be colored or otherwise tinted to reflect the progressive decision-making of the natural language processing algorithm from estimating that the ten-digit string was a phone number to ultimately concluding that the ten-digit string was a product identification number.

The systems and methods described herein improve the functioning of computers by improving the detail provided by, and the overall processing of content by, natural language processing algorithms. Natural language processing algorithms do not provide a sufficient level of information about how their decision-making is performed, which can mask errors and weaknesses in those algorithms. For example, a natural language processing algorithm might be configured to categorize portions of text content in one of two categories, but may categorize a word in a first category over a second category merely because it had a 91% confidence in the first category and a 90% confidence in the second category. In certain circumstances (e.g., uses of a single model), confidence values may sum to 100% (e.g., the confidence values may be 91% and 9%); however, in other circumstances (e.g., use of multiple models, use of a hierarchal model, or the like), confidence values need not sum to 100% (e.g., the confidence values may be 5%, 10%, 3%, and 99%). This sort of problem is aggravated across strings of characters (e.g., phone numbers, serial numbers, or the like), where a natural language processing algorithm might effectively change its categorization midday through processing a string based on later portions of the string. The processes described herein reveal these weaknesses in natural language processing algorithms, allowing developers to recognize the weaknesses and better improve the accuracy of natural language processing algorithms. For example, the steps described herein provide a key window into circumstances where a natural language processing algorithm may change its categorization of a portion of text content midway through processing that portion due to, for example, an error.

FIG. 1 shows a system 100. The system 100 may include at least one device 110, at least one database system 120, and/or at least one server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Devices 110 may execute natural language processing algorithms, determine a plurality of colors, determine a plurality of categories, determine confidence values, display a user interface comprising a visualization of text content, and/or other steps as described herein. Database systems 120 may store text content, retrieve text content, and/or perform other steps as described herein. Databases may include, but are not limited to relational databases, hierarchical databases, distributed databases, in-memory databases, flat file databases, XML databases, NoSQL databases, graph databases, and/or a combination thereof. Server systems 130 may execute natural language processing algorithms, determine a plurality of colors, determine a plurality of categories, determine confidence values, display a user interface comprising a visualization of text content, and/or other steps as described herein. The network 140 may include a local area network (LAN), a wide area network (WAN), a wireless telecommunications network, and/or any other communication network or combination thereof.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
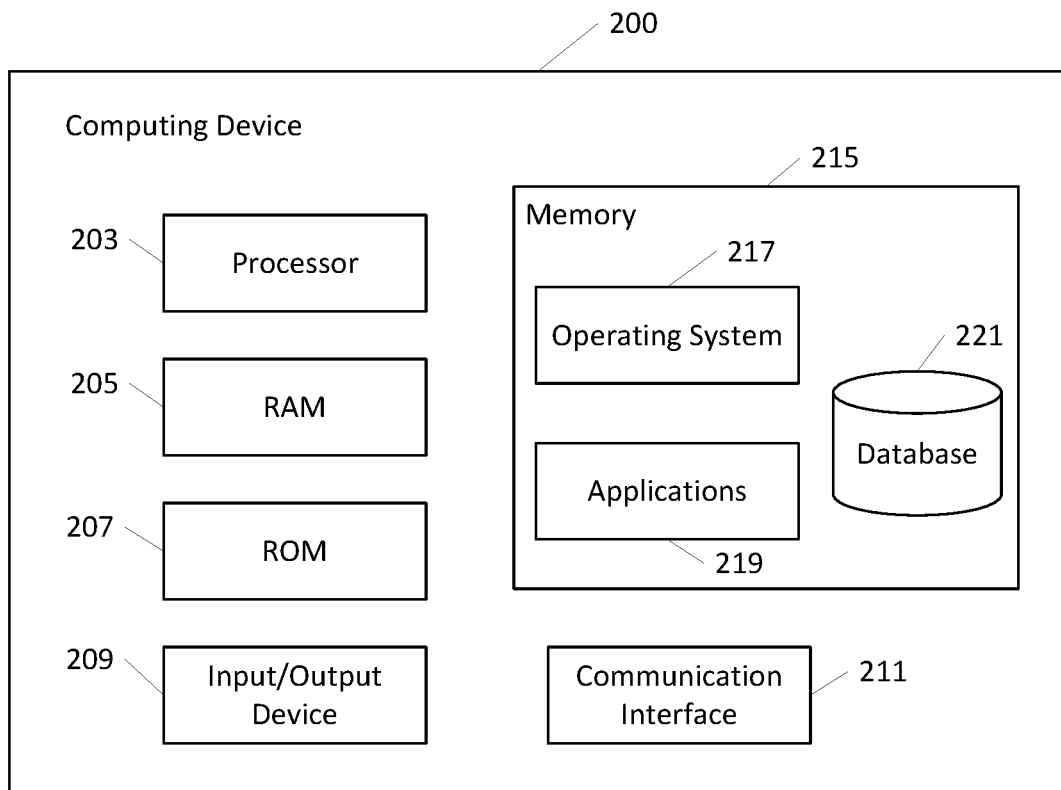
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
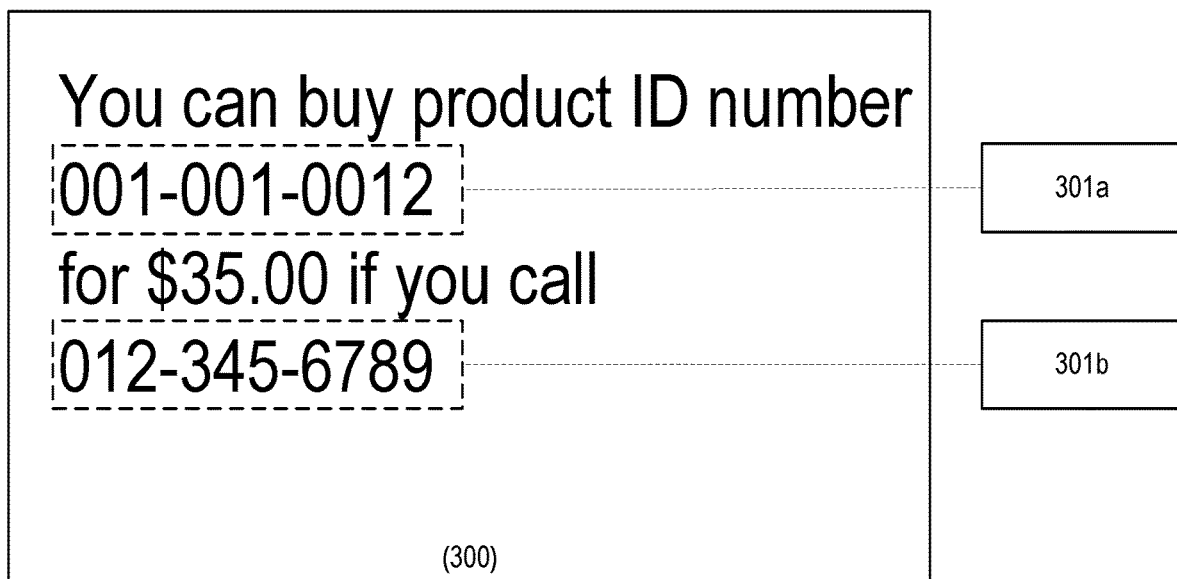
FIG. 3 shows text content which may be processed by a natural language processing algorithm.

FIG. 3 shows an example of text content including a plurality of portions which may be analyzed by a natural language processing algorithm. In particular, FIG. 3 shows text content 300, which includes a first numerical string 301*a* and a second numerical string 301*b*. The text content 300 shown in FIG. 3 is shown for illustrative purposes, and any type of text may be analyzed by a natural language processing algorithm. For example, the text content 300 might instead be a transcript, a series of numbers, a paragraph from a book, an entire novel, or the like. The portions highlighted in FIG. 3, particularly the first numerical string 301*a* and the second numerical string 301*b*, may be considered by the natural language processing algorithm. That said, the natural language processing algorithm may process or not process any portions of the text content 300. For example, a natural language processing algorithm configured to analyze the positive and/or negative sentiment of text might be configured to ignore numbers. As another example, a natural language processing algorithm might be configured to analyze certain portions of text content (e.g., long words), but not others (e.g., short words, numbers, or the like).

The first numerical string 301*a* ("001-001-0012") corresponds to a product identification number, and the second numerical string 301*b* ("012-345-6789") corresponds to a telephone number. That said, the formatting of such strings is the same, such that pure identification of the format of the strings (that is, three numbers, a hyphen, three numbers, a hyphen, and four numbers) does not aid in the categorization of whether the strings correspond to a product identification number or a telephone number. A natural language processing algorithm may be configured to process the text content 300 to determine that, for example, because "product ID number" precedes the first numerical string 301*a*, it is a product identification number. Such a determination might require recognizing that the words "product ID number" belong together and that "ID" stands for "identification." A natural language processing algorithm may additionally and/or alternatively be configured to determine that, because "call" precedes the second numerical string 301*b*, it is a telephone number. A natural language processing algorithm may additionally and/or alternatively be configured to determine that other portions of the text content 300, such as the price ("$35.00"), is neither a product identification number nor a telephone number.

Processing, by a natural language processing algorithm, of text content like the text content 300 may comprise determining one or more confidence values associated with categorization of some or all of the text content 300. During processing of the text content 300, a natural language processing algorithm might not be perfectly confident that the first numerical string 301*a* corresponds to a product identification number and the second numerical string 302*a* corresponds to a telephone number. For example, a natural language processing algorithm may be 51% confident that the first numerical string 301*a* corresponds to a product identification number and 50% confident that it corresponds to a telephone number, such that it might conclude that the first numerical string 301*a* corresponds to a product identification number. Confidence values corresponding to the confidence of the natural language processing algorithm may be in any desired format, including percentage values (e.g., 10% confidence), confidence scores (e.g., "Strong," "Weak"), or the like.

Figure 4:
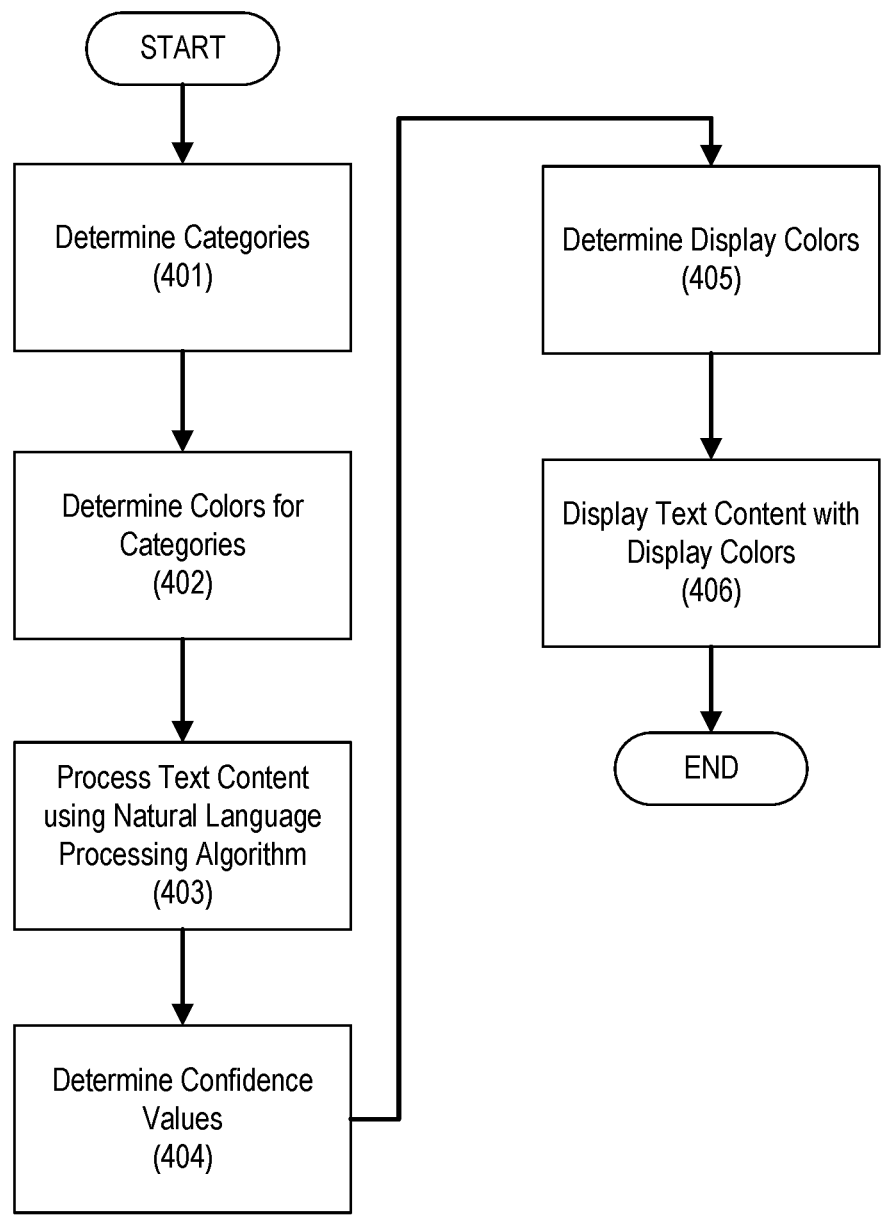
FIG. 4 shows a flow chart of a process for visualizing natural language processing algorithm confidence according to one or more aspects of the disclosure.

Discussion will now turn to how a computing device, such as one or more of the devices 110, may display content in a manner reflecting the confidence of natural language processing. FIG. 4 shows a flow chart of a process for displaying the confidence of natural language processing across text content according to one or more aspects of the disclosure. The steps depicted in FIG. 4 may be performed by one or more computing devices as described herein, such as any one of the devices 110, any one of the server systems 130, the computing device 200, and/or any computing device comprising one or more processors and memory storing instructions that, when executed by the one or more processors, cause performance of the steps shown in FIG. 4. The steps depicted in FIG. 4 may be rearranged. For example, step 402 may be determined after 403.

In step 401, one or more categories may be determined. Natural language processing algorithms may be configured to categorize one or more portions of text content using the one or more categories. For example, a natural language processing algorithm may be configured to categorize sentences of a blog post as either positive or negative. As another example, a natural language processing algorithm may be configured to categorize one or more words in a paragraph as relating to a product. Any number of categories may be determined. For example, one category may be determined, such that a natural language processing algorithm may be configured to determine whether one or more characters correspond to the category or not. As another example, twenty categories may be determined, such that the natural language processing algorithm may be configured to determine whether one or more words correspond to at least one of the twenty categories or not.

A category may be any objective or subjective determination with regard to all or portions of text content. For example, a subjective category may indicate whether all or portions of the text content indicate positive or negative sentiment, whereas an objective category may indicate whether all or portions of the text content comprise words in English or Spanish. Categories may overlap in whole or in part. For example, a word may be associated with both a positive category and a category indicating that the word is a Spanish word.

In step 402, colors corresponding to the categories may be determined. Categories may each correspond to a different color, such that portions of text content corresponding to the categories may be visually identified. For example, a positive category might be associated with the color green, whereas a negative category might be associated with the color red. Any color may be selected, and colors may comprise gradients, partially transparent colors, and the like.

In step 403, text content may be processed using one or more natural language processing algorithms. A natural language processing algorithm may be any algorithm configured to process text content and categorize all or portions of the text content based on the categories determined in step 401. As such, the one or more natural language processing algorithms may comprise a function, a series of functions, a computer executable, or the like. The one or more natural language processing algorithms may comprise one or more machine learning models. Such machine learning models may be trained using example text content that has, for example, been tagged based on one or more of the categories determined in step 401, such that the machine learning models may be trained to determine how to categorize new text content using the categories determined in step 401.

The text content processed in step 403 may be the same or similar as the text content 300. As such, the text content need not be in any particular format or length. The natural language processing algorithm may, when processing the text content, categorize all or portions of the text content in any manner desired. For example, the natural language processing algorithm may be configured to consider whether to categorize each character, word, sentence, paragraph, or any portion thereof, of text content.

The natural language processing algorithm may be configured to categorize one or more words in the text content. This process may advantageously allow for the categorization of specific words of interest, such as those relating to a particular product, a particular sentiment, or the like. For example, by categorizing text content on a word-by-word basis, and as described further herein, the overall trajectory of the processing performed by a natural language processing algorithm across a sentence may be analyzed. The natural language processing algorithm may additionally and/or alternatively be configured to categorize one or more characters in the text content. This process may advantageously allow for the categorization of long strings of numbers, complex words, or the like. For example, by categorizing text content on a character-by-character basis, and as described further herein, the overall trajectory of the processing performed by a natural language processing algorithm across a word, series of words, or the like may be analyzed. The natural language processing algorithm may additionally and/or alternatively be configured to categorize one or more paragraphs in the text content. This process may advantageously allow for the categorization of lengthy text content, such as novels, scientific articles, or the like.

The natural language processing algorithm need not process the same size or type of portions of text content. The particular determination of which portions may be characterized may vary based on the length of the text content, the goals of the processing, and the like. As such, the granularity with which the natural language processing algorithm processes one or more portions of the text content may be modified to better reflect the decision-making of the natural language processing algorithm across the text content. The size of the portions processed by the natural language processing algorithm (e.g., one character, one word, one sentence, one paragraph) may be changed based on the length of the text content. For example, if the text content is one million words, processing on a character-by-character basis may be undesirably slow. As another example, if the text content is a single word, processing on a word-by-word basis might not be useful for the purposes of analyzing how a natural language processing algorithm processes the text content.

Natural language processing algorithms may process text content in a variety of ways. For example, natural language processing algorithms may be provided a Uniform Resource Locator (URL) to a web page containing text content. Additionally and/or alternatively, a natural language processing algorithm may comprise a function, and the text content may be provided to the function as input. Additionally and/or alternatively, a natural language processing algorithm may receive text content from a database, such as any of the servers described in FIG. 1.

In step 404, confidence values are determined. Confidence values may comprise any indication of the accuracy, confidence, and/or strength of a categorization made by the one or more natural language processing algorithms in step 403. The confidence values may thereby comprise one or more indications of how strongly one or more portions of text content correspond to the categories determined in step 401. For example, for a particular portion of the text content 300, a first confidence value corresponding to a first category may be 51%, and a second confidence value corresponding to a second category may be 30%. In such a circumstance, the natural language processing algorithm may be said to be more confident that the particular portion of the text content 300 belongs to the first category than it is confident that the second portion of the text content 300 belongs to the second category. The confidence values may, but need not, sum to 100%. For example, the confidence values may be 51% and 49%, or may be 10% and 30%. Determining the confidence values may comprise selecting, from a large quantity of confidence values, confidence values that satisfy a threshold. For example, a natural language processing algorithm may determine hundreds of confidence values for hundreds of different categories, and the largest five confidence values may be selected from the hundreds of confidence values.

In step 405, display colors are determined. Determining the display colors may comprise determining one or more new colors based on the confidence values from step 404 and the colors determined in step 402. In this manner, the confidence values determined in step 404 which correspond to a particular character, word, phrase, sentence, and/or other portion of the text content may be visually represented based on the colors determined in step 402.

Determining the display color may comprise combining two different colors based on confidence values. A first color that corresponds to a first category of the plurality of categories determined in step 401 may be determined. A second color that corresponds to a second category of the plurality of categories determined in step 401 may be determined. A first confidence value may be determined that corresponds to the first category, and a second confidence value may be determined that corresponds to the second category. The display color may be generated by combining, based on a comparison of the first confidence value and the second confidence value, the first color and the second color.

Determining the display colors may comprise blending one or more of the colors determined in step 402. Blending the colors may be based on the confidence values. For example, a first confidence value for a first category may be 20%, and a second confidence value for a second category may be 40%. In such a circumstance, the colors corresponding to the first category and the second category may be blended such that the color for the first category is ⅓ of the new color, and the color for the second category is ⅔ of the new color. Additionally and/or alternatively, determining the display colors may comprise modifying an opacity of one or more of the colors determined in step 402. For example, two colors may be overlaid with different levels of opacity based on confidence values. Additionally and/or alternatively, blending the one or more colors may comprise generating stacked background bars comprising each color, wherein the bars horizontally extend the length a portion of the text content, and wherein the height of each bar is based on a corresponding confidence value. For example, for confidence values of 75% and 25%, a stacked background may be generated such that one color is 75% of the height of the background and another color is 25% of the height of the background. Such a stacked background may be similar to a gradient, though it might not have a blurring and/or blending effect between different colors, as is the case with some styles of gradients.

Determining the display colors may comprise determining a gradient based on one or more of the colors determined in step 402. In this manner, the strength of a confidence value for a category may be represented by the strength of a corresponding color in the gradient. For example, if the confidence values for two categories are equal, the gradient might represent both colors equally. In contrast, if the confidence values of the two categories are not equal, then one color may appear more strongly in the gradient than the other.

Determining the display colors may comprise selecting a single color for one or more portions of the text content. In some circumstances, confidence values may be so strong (e.g., may satisfy a threshold, such as exceeding 90% confidence) such that blending the colors might not be worthwhile (e.g., and a color corresponding to a category may be selected). As such, based on determining that a confidence value corresponding to a category satisfies a threshold, determining a display color may comprise selecting a display color based on the category. In this way, for example, if a character, word, and/or other portion of the text content is associated with a confidence value of over 80% for a particular category, a display color may be selected for that character, word, and/or other portion based on the particular category, such that the color is displayed with the display color being predominant. For example, the display color may be displayed more strongly as compared to other colors and/or a background color. Additionally and/or alternatively, the color selected may be a background of a user interface, such that other colors may be a relatively minimal part of the display. Selection of the background color of the user interface might be advantageous where the user interface is configured to display uncertainties (e.g., where the natural language processing algorithm is relatively uncertain about its categorization), but need not necessarily display instances where the natural language processing algorithm is confidence (e.g., where the confidence value for a particular word exceeds 90%, or the like).

Determining the display colors may additionally and/or alternatively comprise determining other parameters of the text content. For example, based on the confidence values, a weight (e.g., bold, not bold), size (e.g., 14 point, 12 point), and/or font of the text content may be determined. The text content may additionally and/or alternatively be configured to, based on the confidence values, animate or otherwise modify presentation (e.g., pulse, shake, blink, or the like). This may advantageously allow the text content to be displayed in a variety of ways to signal the confidence of natural language processing.

In step 406, the text content is displayed based on the display colors. The display colors may be displayed as a background color, a text color, a color of a line or other object near a corresponding portion of the text content, or the like. In this manner, the user interface may be configured to display each portion of the plurality of portions of the text content using a corresponding display color. This may advantageously indicate changes in confidence of the natural language processing algorithm across a plurality of portions of the text content.

Displaying the text content based on the display colors need not entail using a specific font color or background color. For example, portions of the text content may be underlined using a color, may display a color when highlighted, or the like. Moreover, additional information about the portion of the text content may be displayed. For example, the confidence values may be displayed next to or near corresponding portions of text content, such as when a user hovers over and/or clicks a portion of text content.

Displaying the text content based on the display colors need not entail coloring all of the text content. For example, first words of the text content might be displayed based on one or more of the display colors based on their confidence values, but second words of the text content might be displayed in a default manner. In this manner, for example, the process might cause high-confidence words to be displayed based on one or more of the display colors, low-confidence words to be displayed based on one or more of the display colors, or the like.

Displaying the text content may additionally and/or alternatively comprise changing other display parameters of the text content. For example, rather than displaying the text content based on the display colors, a size or weight (e.g., bold, normal, thin) for the text content may be determined based on the confidence of the natural language processing algorithm. As another example, the text content may be caused to move, blink, and/or otherwise animate.

Figure 5:
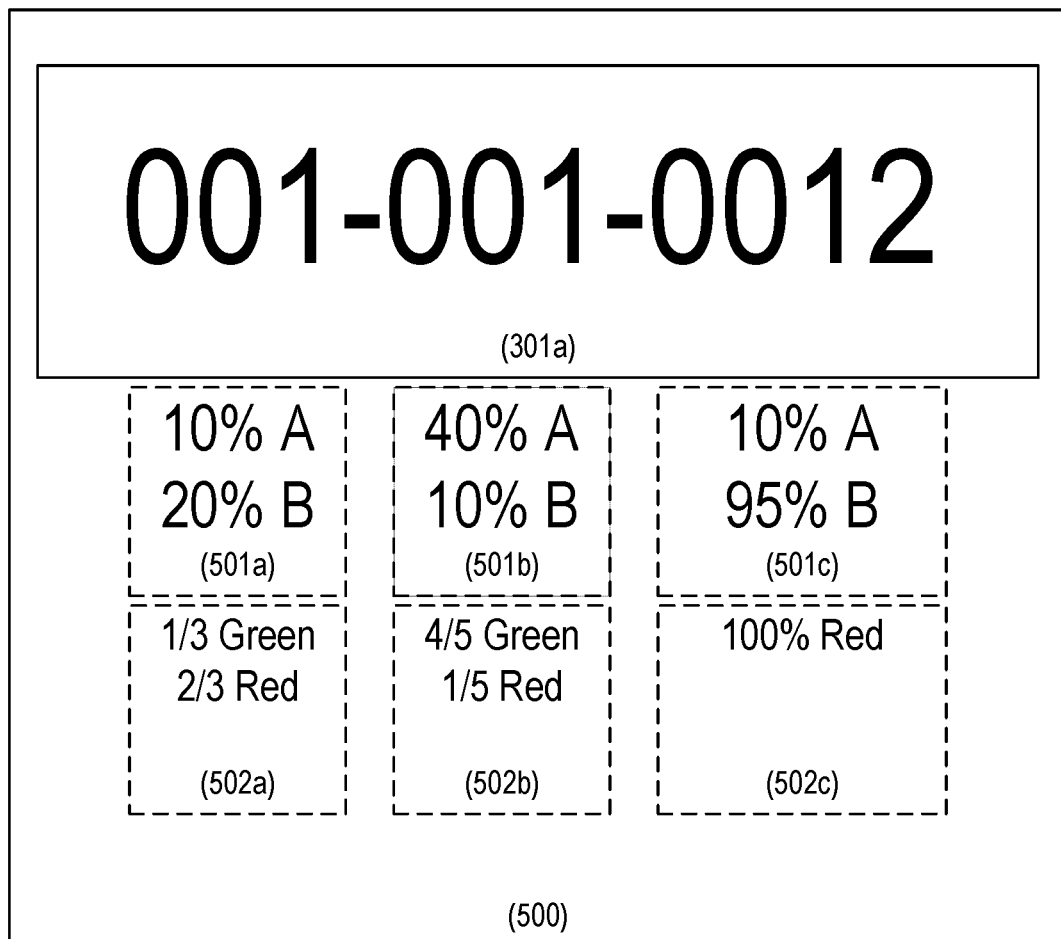
FIG. 5 shows an example user interface that displays the first numerical string.

FIG. 5 shows an example user interface 500 that displays the first numerical string 301*a*. Below three different portions of the first numerical string 301*a* are boxes 501*a*-501*c*, 502*a*-502*c* that indicate confidence values corresponding to a particular portion of the first numerical string 301*a* along with display colors corresponding to the particular portion of the first numerical string 301*a*. The boxes shown in FIG. 5 are purely illustrative given the black-and-white nature of the figure, and need not be shown by the user interface 500.

In particular, FIG. 5 shows colors which might be selected for particular characters of the first numerical string 301*a* for two categories: category A, which corresponds to the color green, and category B, which corresponds to the color red. For example, category A may correspond to a serial number, and category B may correspond to a phone number. As shown by box 501*a*, the first three characters of the first numerical string 301*a* are associated with confidence values indicating a 10% confidence in category A and a 20% confidence in category B. As indicated by these two confidence values, confidence values need not sum to 100%. That said, in the illustration shown in FIG. 5, all confidence values generated by a natural language processing algorithm might sum to 100%. For example, the confidence values shown in FIG. 5 may be the largest confidence values of a large plurality of confidence values generated by a natural language processing algorithm (e.g., for hundreds of other categories, such that the confidence values might sum to 100% but may nonetheless be small and/or otherwise insignificant). The confidence values shown in FIG. 5 may, in this way, be those which satisfy a threshold (e.g., 10% or greater). As shown in box 502*a*, the first three characters of the first numerical string 301*a* might be colored with a display color that is a mix of ⅓ green and ⅔ red. As shown by box 501*b*, the second three characters of the first numerical string 301*a* are associated with confidence values indicating a 40% confidence in category A and a 10% confidence in category B. Thus, as shown in box 502*b*, the second three characters of the first numerical string 301*a* might be colored with a display color that is a mix of ⅘ green and ⅕ red. And, as shown by box 501*c*, the next four characters of the first numerical string 301*a* are associated with confidence values indicating a 10% confidence in category A and a 95% confidence in category B. In this circumstance, the confidence value for category B may satisfy a confidence threshold, such that the confidence, by the natural language processing algorithm, that the next four characters belong in category B is high enough to determine that such characters belong to category B. Thus, as shown in box 502*b*, the second three characters of the first numerical string 301*a* might be colored with a display color that is completely red. Alternatively, as detailed above with respect to FIG. 4, the color for the last four characters of the first numerical string 301*a* may be the background color of the user interface 500.

Inspection of the user interface 500 shown in FIG. 5 may allow users, such as developers of a natural language processing algorithm, to understand how a natural language processing algorithm processed the first numerical string 301*a*. For example, the display color of the first numerical string 301*a* may indicate that the natural language processing algorithm initially was fairly uncertain as to the categorization of the first numerical string 301*a*, but ultimately concluded at the end that all or portions of the first numerical string 301*a* belonged in category B. Such information may be used to determine, for example, that the natural language processing algorithm is easily confused by earlier portions of strings similar to first numerical string 301*a*, which may be valuable information in improving the efficiency, accuracy, or overall functionality of the natural language processing algorithm.

FIG. 6*a* shows illustrative text content 601. The text content 601 contains two sentences: "A very quick red panda" and "012-345-6789." The text content 601 may be the same or similar as the text content 301*a* and/or the text content 300. The text content 601 is shown for illustrative purposes, and any type of text may be analyzed by a natural language processing algorithm. For example, the text content 601 might instead be a transcript, a series of numbers, a paragraph from a book, an entire novel, or the like.

FIG. 6*b*, which is shown with color, shows how different portions of the text content 601 may be categorized by a natural language processing algorithm. Specifically, six different display colors 602*a*-602*f* are shown.

Display color 602*a*, a light gray color, is shown associated with the word "A." This color may be selected based on the natural language processing algorithm ignoring or otherwise not categorizing all or a portion of the text content 601. For example, the display color 602*a* is shown for the word "A" because the word might not have any particular special meaning other than allowing a sentence in the text content 601 to be grammatically correct.

Display color 602*b*, which is a gradient predominantly of green but with a small amount of yellow at the bottom, is shown associated with the words "very quick" in the text content 601. The color green may correspond to, for example, an adjective. The color yellow may correspond to a business title, such as "Very Quick Transportation Company" or the like. The predominant use of the color green in the display color 602*b* may be shown to indicate that a natural language processing algorithm is largely confident that the words "very quick" as used in the text content 601 are intended to be an adjective. The minimal use of the color yellow in the display color 602*b* may indicate, for example, that the natural language processing algorithm might alternatively consider the words as potentially part of a business title, but that it is less confident in such a classification as compared to its confidence that the words correspond to an adjective.

Display color 602*c*, which is white, is shown associated with the words "red panda." Use of the color white and/or a transparent color (that is, for example, the background color of a user interface) might be used where a natural language processing algorithm is particularly confident as to a classification. For example, a natural language processing algorithm may be 100% sure that the words "red panda" are a noun, such that it need not display uncertainty in the manner shown with respect to, for example, the display color 602*b*. Alternatively, a solid color may be used as display color 602*c*. For example, if a noun category corresponded to the color orange, then the display color 602*c* may be a solid orange.

Display color 602*d*, which is blue, is shown associated with the digits "012." The display color 602*d* may indicate that, at least at the beginning of the string of numbers "012-345-6789," a natural language processing algorithm believed the string of numbers to correspond to a phone number.

Display color 602*e*, which is a gradient from blue to red, is shown associated with the digits "345." This gradient is shown indicating that, as a natural language processing algorithm continued to process the numerical string of the text content 601, it progressively became more confident that the numerical string corresponded to a product identification number (that is, in this example, the color red). Such a gradient may be helpful to a viewer in showing when a natural language processing algorithm began to change its decision with respect to all or portions of the text content 601.

Display color 602*f*, which is red (and, as indicated above, may correspond to a product identification number category), is shown associated with the digits "6789." Such a color may indicate that a natural language processing algorithm ended processing of the string of digits shown in FIG. 6*b* with the conclusion that all or portions of the string of digits corresponded to a product identification number.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

The invention claimed is:

1. A method comprising:
processing, using a natural language processing algorithm, a plurality of characters of a word of text content by associating different characters of the plurality of characters of the word of the text content with a corresponding one or more of a plurality of categories;
for each character of the plurality of characters of the text content:
determining, based on the processing, a plurality of confidence values that indicate, for the character, a degree of confidence corresponding to one or more of the plurality of categories, wherein at least two of the plurality of confidence values are different; and
determining, for the character and based on the plurality of confidence values, a corresponding display indication that indicates the degree of confidence corresponding to one or more of the plurality of categories when processing, using the natural language processing algorithm, the character, wherein at least two characters of the word correspond to different display indications; and
causing display, by a computing device, of a user interface comprising a visualization of the text content, wherein the user interface is configured to display the corresponding display indication of each character of the plurality of characters of the word of the text content such that the user interface indicates a change in confidence when processing, using the natural language processing algorithm, different characters of the plurality of characters of the word of the text content.

2. The method of claim 1, wherein determining the corresponding display indication comprises:
determining a first indication that corresponds to a first category of the plurality of categories;
determining a second indication that corresponds to a second category of the plurality of categories;
determining a first confidence value, of the plurality of confidence values, that corresponds to the first category;
determining a second confidence value, of the plurality of confidence values, that corresponds to the second category; and
combining, based on a comparison of the first confidence value and the second confidence value, the first indication and the second indication.

3. The method of claim 1, wherein the causing the display of the user interface comprises causing display of a gradient based on a difference between a first display indication for a first character and a second display indication for a second character.

4. The method of claim 1, wherein determining the corresponding display indication comprises:
blending, based on the plurality of confidence values, a first display indication for a first character and a second display indication for a second character with an indication of the user interface.

5. The method of claim 1, wherein the corresponding display indication comprises a color different than a background color of the user interface.

6. The method of claim 1, wherein each of the plurality of characters is associated with a different indication.

7. The method of claim 1, wherein each category of the plurality of categories corresponds to a different possible meaning of at least a portion of the text content.

8. A computing device comprising:
one or more processors; and
memory storing instructions that, when executed by the one or more processors, cause the computing device to:
process, using a natural language processing algorithm, a plurality of characters of a word of text content by associating different characters of the plurality of characters of the text content with a corresponding one or more of a plurality of categories;
for each character of the plurality of characters of the text content:
determine, based on the processing, a plurality of confidence values that indicate, for the character, a degree of confidence corresponding to one or more of the plurality of categories, wherein at least two of the plurality of confidence values are different; and
determine, for the character and based on the plurality of confidence values, a corresponding display indication that indicates the degree of confidence corresponding to one or more of the plurality of categories when processing, using the natural language processing algorithm, the character wherein at least two characters of the word correspond to different display indications; and
cause display of a user interface comprising a visualization of the text content, wherein the user interface is configured to display the corresponding display indication of each character of the plurality of characters of the word of the text content such that the user interface indicates a change in confidence when processing, using the natural language processing algorithm, each different characters of the plurality of characters of the word of the text content.

9. The computing device of claim 8, wherein the instructions, when executed by the one or more processors, cause the computing device to determine the corresponding display indication by causing the computing device to:
determine a first indication that corresponds to a first category of the plurality of categories;
determine a second indication that corresponds to a second category of the plurality of categories;
determine a first confidence value, of the plurality of confidence values, that corresponds to the first category;
determine a second confidence value, of the plurality of confidence values, that corresponds to the second category; and combine, based on a comparison of the first confidence value and the second confidence value, the first indication and the second indication.

10. The computing device of claim 8, wherein the instructions, when executed by the one or more processors, cause the computing device to cause display of the user interface by causing the computing device to cause display of a gradient based on a difference between a first display indication for a first character and a second display indication for a second character.

11. The computing device of claim 8, wherein the instructions, when executed by the one or more processors, cause the computing device to determine the corresponding display indication by causing the computing device to:
blend, based on the plurality of confidence values a first display indication for a first character and a second display indication for a second character with an indication of the user interface.

12. The computing device of claim 8, wherein the corresponding display indication comprises a color different than a background color of the user interface.

13. The computing device of claim 8, wherein each of the plurality of characters is associated with a different indication.

14. The computing device of claim 8, wherein each category of the plurality of categories corresponds to a different possible meaning of at least a portion of the text content.

15. One or more non-transitory computer-readable media storing instructions that, when executed by one or more processors of a computing device, cause the computing device to:
process, using a natural language processing algorithm, a plurality of characters of a word of text content by associating different characters of the plurality of characters of the word of text content with a corresponding one or more of a plurality of categories;
for each character of the plurality of characters of the text content:
determine, based on the processing, a plurality of confidence values that indicate, for the character, a degree of confidence corresponding to one or more of the plurality of categories, wherein at least two of the plurality of confidence values are different; and
determine, for the character and based on the plurality of confidence values, a corresponding display indication that indicates the degree of confidence corresponding to one or more of the plurality of categories when processing, using the natural language processing algorithm, the character, wherein at least two characters of the word correspond to different display indications; and
cause display of a user interface comprising a visualization of the text content, wherein the user interface is configured to display the corresponding display indication of each character of the plurality of characters of the word of the text content such that the user interface indicates a change in confidence when processing, using the natural language processing algorithm, each different characters of the plurality of characters of the word of the text content.

16. The one or more non-transitory computer-readable media of claim 15, wherein the instructions, when executed by the one or more processors, cause the computing device to determine the corresponding display indication by causing the computing device to:
determine a first indication that corresponds to a first category of the plurality of categories;
determine a second indication that corresponds to a second category of the plurality of categories;
determine a first confidence value, of the plurality of confidence values, that corresponds to the first category;
determine a second confidence value, of the plurality of confidence values, that corresponds to the second category; and
combine, based on a comparison of the first confidence value and the second confidence value, the first indication and the second indication.

17. The one or more non-transitory computer-readable media of claim 15, wherein the instructions, when executed by the one or more processors, cause the computing device to cause display of the user interface by causing the computing device to cause display of a color gradient based on a difference between a first display indication for a first character and a second display indication for a second character.

18. The one or more non-transitory computer-readable media of claim 15, wherein the instructions, when executed by the one or more processors, cause the computing device to determine the corresponding display indication by causing the computing device to:
blend, based on the plurality of confidence values, a first display indication for a first character and a second display indication for a second character with an indication of the user interface.

19. The one or more non-transitory computer-readable media of claim 15, wherein the corresponding display indication comprises a color different than a background color of the user interface.

20. The one or more non-transitory computer-readable media of claim 15, wherein each character of the plurality of characters is associated with a different indication.

* * * * *